United States Patent
Zhu et al.

(10) Patent No.: US 10,911,775 B1
(45) Date of Patent: Feb. 2, 2021

(54) SYSTEM AND METHOD FOR VISION-BASED JOINT ACTION AND POSE MOTION FORECASTING

(71) Applicant: FUJI XEROX CO., LTD., Tokyo (JP)

(72) Inventors: Yanjun Zhu, Buffalo, NY (US); Yanxia Zhang, Cupertino, CA (US); Qiong Liu, Cupertino, CA (US); Andreas Girgensohn, Palo Alto, CA (US); Daniel Avrahami, Mountain View, CA (US); Francine Chen, Menlo Park, CA (US); Hao Hu, Sunnyvale, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/816,130

(22) Filed: Mar. 11, 2020

(51) Int. Cl.
*H04N 19/20* (2014.01)
*H04N 19/513* (2014.01)
*G06K 9/00* (2006.01)
*G06T 9/00* (2006.01)

(52) U.S. Cl.
CPC ....... *H04N 19/521* (2014.11); *G06K 9/00342* (2013.01); *G06K 9/00718* (2013.01); *G06K 9/00744* (2013.01); *G06T 9/002* (2013.01); *H04N 19/20* (2014.11)

(58) Field of Classification Search
USPC .................................................. 375/240.08
See application file for complete search history.

(56) References Cited

U.S. PATENT DOCUMENTS

| | | | | |
|---|---|---|---|---|
| 2008/0263592 | A1* | 10/2008 | Kimber | G06F 3/0486 725/38 |
| 2009/0232353 | A1* | 9/2009 | Sundaresan | G06K 9/00342 382/103 |

(Continued)

OTHER PUBLICATIONS

Farha, Y.A., et al., When Will You do What?—Anticipating Temporal Occurrences of Activities, Proceedings of the IEEE Conference on Computer Vision and Pattern Recognition, 2018, pp. 5343-5352.

(Continued)

*Primary Examiner* — Behrooz M Senfi
(74) *Attorney, Agent, or Firm* — Procopio, Cory, Hargreaves & Savitch LLP

(57) ABSTRACT

A computer-implemented method, comprising extracting each frame of a video sequence, estimating current poses of a subject within each frame and determining joint locations for a joint associated with the subject within each frame, computing optical flows between each pair of consecutive video frames, extracting motion features from each video frame of the video sequence based on the optical flows, encoding state information based on the current poses and the motion features, determining a current action label for each motion feature in the state information for a first frame; predicting future action labels for each motion feature in a second frame subsequent to the first frame, based on the current pose, action label and state information, predicting future poses for each motion feature in the second frame (Continued)

based on the current poses and the state information; and refining the current action label, the future action labels, and the future poses.

20 Claims, 7 Drawing Sheets
(4 of 7 Drawing Sheet(s) Filed in Color)

(56) References Cited

U.S. PATENT DOCUMENTS

| | | | | |
|---|---|---|---|---|
| 2011/0267344 | A1* | 11/2011 | Germann | G06T 15/205 345/420 |
| 2012/0042288 | A1* | 2/2012 | Liao | H04N 1/00241 715/863 |
| 2019/0205629 | A1* | 7/2019 | Zhu | G06K 9/00335 |
| 2020/0167715 | A1* | 5/2020 | Bhatt | G06Q 10/0633 |

OTHER PUBLICATIONS

Carreira, J., et al., Quo Vadis, Action Recognition? A New Model and the Kinetics Dataset, 2017 IEEE Conference on Computer Vision and Pattern Recognition (CVPR), Jul. 2017, 10 pgs.
Han, T., et al., Human Action Forecasting by Learning Task Grammars, arXiv:1709.06391v1, Sep. 19, 2017, 8 pgs.
Jain, M., et al., Action Localization with Tubelets from Motion, Proceedings of the IEEE Conference on Computer Vision and Pattern Recognition, 2014, pp. 740-747.
Ke, Q., et al., Time-Conditioned Action Anticipation in One Shot, Proceedings of the IEEE Conference on Computer Vision and Pattern Recognition, 2019, pp. 9925-9934.
Koppula, H. S., et al., Anticipating Human Activities Using Object Affordances for Reactive Robotic Response, IEEE Tranactions on Pattern Analysis and Machine Intelligence, 2015, 38(1), pp. 14-29.
Li, Y., et al. Online Human Action Detection Using Joint Classification-Regression Recurrent Neural Networks, European Conference on Computer Vision, 2016, pp. 203-220.
Ma., S., et al., Learning Activity Progression on LSTMs for Activity Detection and Early Detection, Proc. IEEE Conference on Computer Vision and Pattern Recognition, 2016, pp. 1942-1950.
Mahmud, T., Joint Prediction of Activity Label and Starting Times in Untrimmed Videos, Proceedings of the IEEE International Conference on Computer Vision, 2017, pp. 5773-5782.
Martinez, J., et al., On Human Motion Prediction Using Recurrent Neural Networks, Proceedings of the IEEE Conference on Computer Vision and Pattern Recognition, 2017, pp. 2891-2900.
Ryoo, M.S., Human Activity Prediction: Early Recognition of Ongoing Activities from Streaming Videos, IEEE International Conference on Computer Vision (ICCV) Barcelona, Spain, Nov. 2011, 8 pgs.
Simonyan, K., et al., Two-Stream Convolutional Networks for Action Recognition in Videos, Advances in Neural Information Processing Systems, 2014, pp. 568-576.
Srivastava, N., et al., Unsupervised Learning of Video Representations Using LSTMs, Proc. International Conference on Machine Learning (ICML), 2015, pp. 843-852.
Toyer, S., et al., Human Pose Forecasting via Deep Markov Models, 2017 International Conference on Digital Image Computing: Techniques and Applications (DICTA), 2017, 8 pgs.
Walker, J., et al., The Pose Knows: Video Forecasting by Generating Pose Futures, Proceedings of the IEEE International Conference on Computer Vision, 2017, pp. 3332-3341.
Zhang, Y. et al., Activity Forecasting in Routine Tasks by Combining Local Motion Trajectories and High-Level Temporal Models, 2019 IEEE International Conference on Computational Science and Engineering (CSE) and IEEE International Conference on Embedded and Ubiquitous Computing (EUC), 2019, pp. 447-452.

* cited by examiner

SYSTEM AND METHOD FOR VISION-BASED JOINT ACTION AND POSE MOTION FORECASTING

BACKGROUND

Field

Aspects of the example implementations relate to methods, systems and user experiences associated with image-based predictions in an environment, and more specifically, a vision-based method for forecasting human actions and poses.

Related Art

Anticipating human actions and motion trajectories addresses the field of predicting what a person is going to do next and how they will perform it, and is crucial in a wide range of related art applications such as assisted living and future co-robotic settings.

Related art approaches can model or forecast human actions and human poses independently. As described herein, human action refers to what people do or cause to happen, such as walking, falling, and opening a door. Human action is highly related to daily life and associated activities, including series of actions. Each action can affect the state of the person, either positively or negatively, independently, or conjointly. Analyzing human actions can enable a machine to better understand the world. Thus, it is expected to better serve humans with people-oriented intelligence, for instance, preventing harmful actions.

Some related art systems focus on human action recognition, including recognizing a human action in a well-trimmed video clip, and can provide the action label after analyzing the entire video clip. These related art systems can also consider temporal action localization, including localizing specific, meaningful actions in the timeline after analyzing an untrimmed video. In the foregoing related art examples, however, the action has already been completed when the system provides the action label, after-the-fact. That is, injury may have already occurred when the analysis of the action is complete.

One of the major issues in related art systems is that the predicted poses rapidly converge to the mean pose and the system performs worse than a zero-velocity predictor (i.e., simply repeating the last observation). Thus, existing systems are incapable of jointly forecasting human actions and poses.

There is therefore an unmet need in the art for a system capable of predicting future actions and motion trajectories for those actions.

SUMMARY

According to an aspect of the example implementations, a computer-implemented method is provided, comprising extracting each frame of a video sequence at a single frame rate, the video sequence including a series of video frames, estimating current poses of a subject within each video frame and determining joint locations for a joint associated with the subject within each video frame, computing optical flows between each pair of consecutive video frames for each time step of the video sequence, extracting motion features from each video frame of the video sequence based on the optical flows, and encoding state information based on the current poses and the motion features.

Example implementations may also include a non-transitory computer readable medium having a storage and processor, the processor capable of executing instructions associated with image-based predictions in an environment, and more specifically, a vision-based method for forecasting human actions and poses.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The details of embodiments of the present disclosure, both as to their structure and operation, can be gleaned in part by study of the accompanying drawings, in which like reference numerals refer to like parts, and in which.

DETAILED DESCRIPTION

Figure 1:
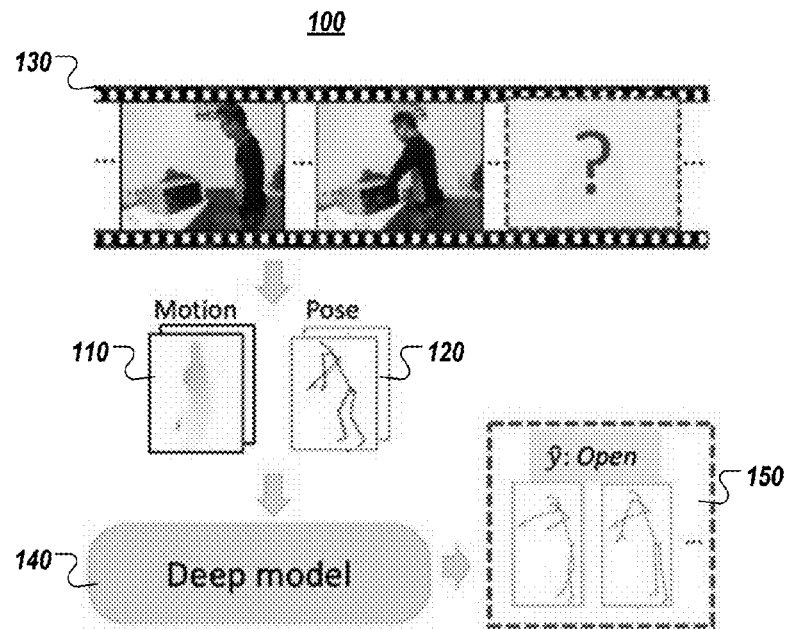
FIG. 1 is a flowchart of an embodiment of a method for predicting future actions and poses from current and previous observations.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to deep learning methods for predicting or otherwise anticipating human action based on observations of preceding actions. Anticipating human actions and motion trajectories are crucial in a wide range of applications such as AI-assisted living and human-robot interaction. Anticipating actions and poses early can benefit a variety of applications including AI-assisted healthcare, for instance, to prevent patient falls. If an AI system can predict falls in hospitals or assisted living locations, it is possible to prevent falls and reduce injuries, and thus reduce medical bills and improve quality of life.

FIG. 1 is a flowchart of an embodiment of a method for predicting future actions and poses from current and previous observations. Humans are naturally able to anticipate actions and an actor's position before it happens based on observations of current actions or poses and individual past experiences in similar circumstances. In a similar fashion, this disclosure provides systems and methods for anticipating or otherwise predicting one or more human action categories and skeleton joints (poses) jointly in future video frames based on preceding video frames that have been previously analyzed.

A method 100 shown in FIG. 1 can extract motion features 110 and poses 120 from one or more video streams 130. The method 100 can be modeled as a multi-task learning problem, including action category classification and skeleton joints regression, both on future frames associated with the video stream 130. Given the video stream 130, the motion features 110 (optical flow) and the poses 120 of human subject can be extracted for every frame of the video stream 130.

As used herein, the skeleton pose can make use of several (e.g., 14 or 25, with 14 representing a total number of joints in an upper portion of the body, and 25 representing a total number of joints in a body; other numbers of joints may be substituted therefor without departing from the inventive scope) joint points to represent a given location on the human body. These skeleton pose or joint points can include, describe, or be associated with joints on the body, such as a hand, wrist, elbow, shoulder, ankle, knee, hip, etc. As described herein, using, for example but not by way of limitation, RGB (red-green-blue) images from a video stream provides a lower dimension subject which is easier to model dynamically. For example, but not by way of limitation, using skeletons (e.g., a size of 25 joints×3) is more compact to represent human subject than using raw pixels from the RGB images (e.g., a size of 480×640).

At every time step t within the video stream 130, the motion features 110 and the poses 120 can be combined to form the deep model 140, which can include a sequence-to-sequence model. The method 100 can then be used to predict a sequence of future actions and poses 150 progressively, based on the deep model 140.

Figure 2:
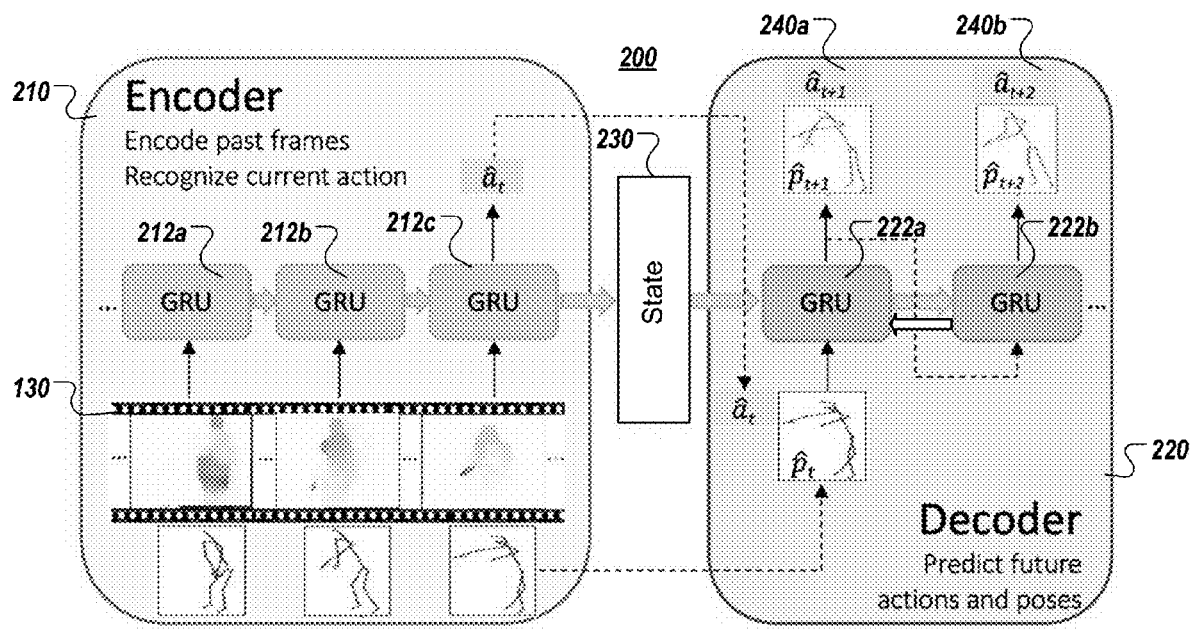
FIG. 2 is a functional block diagram of an embodiment of a system for forecasting joint action and pose motion, according to the disclosure.

FIG. 2 is a functional block diagram of an embodiment of a system for forecasting joint action and pose motion, according to the disclosure. A system 200 can be used to perform one or more aspects of the methods for forecasting joint action and pose motion from video streams (e.g., the video stream 130). The system 200 can include an encoder 210 communicatively coupled to a decoder 220. The system 200 can receive and process the (e.g., RGB) video stream(s) 130 and predict future action and pose sequences jointly. The system 200 can incorporate a multi-task encoder-decoder recurrent network structure.

At each time step t of the video stream 130, the encoder 210 can encode multi-modality features from past video stream information and recognize the current actions viewed in the video stream 130. The encoded information serves to initialize the decoder 220 with relevant information that will progressively perform predictions.

In contrast to systems directed to action recognition and detection that make decisions based on an entire video of past events, action forecasting, as described herein, can include using observations available at the moment, or as they happen in real time, to predict or anticipate motion or poses that immediately following present time. This can be accomplished using a sequential encoder-decoder recurrent network structure of the system 200, as shown.

The encoder 210 can include a recurrent neural network (RNN), such as a gated recurrent network (GRU) or long short-term memory (LSTM). The encoder 210 can have one or more RNNs shown as GRUs 212a, 212b, 212c. The encoder 210 can encode the multi-modal features from past video sequences (e.g., the video stream 130) and determine a current action type based on the past video sequences. The current action type can include a description of actions seen in the video stream 130, for example. As shown in the video stream 130 of FIG. 1, for instance, the user is standing next to, then reaching for, and opening a microwave. The current state information can describe aspects of such a scene.

The decoder 220 can receive the current state information 230 of the encoder 210. The current state information 230, also referred to herein as the state 230, can be encoded by the encoder 210 as a hidden state or otherwise obscured by a hash function, compression, or other applicable process. Thus the state 230 may also be referred to herein as "hidden state" or "encoder state."

The decoder 220 can receive three pieces of information: the state information 230, a predicted current action 200 and detected pose as a starting point. The "loss function" is shown above 240. In FIG. 2, "at" means action types, which corresponds to "yt" in the loss function. The decoder 220 can then implement an RNN 222 (shown as GRU 222a, GRU 222b) to progressively generate future sequence of action and pose pairs 240 (shown as 240a, 240b) based on a model (e.g., the deep model 140) created by the encoded past frames and recognized current actions.

At time t, given the series of past video frames $V_{0:t}$ (e.g., from the video stream 130), the system 200 can be used to predict a sequence of action labels and corresponding poses T time steps in the future. This can be denoted as ($Y_{t:t+T}$, $P_{t:t+T}$). $Y_t$ denotes the action category at time step t and is encoded as a one-hot vector, where 1 for the true class and 0 for all others. $P_t$ is a two dimensional (2D) pose at time t defined by the (x, y) coordinates of a set of key body joints, alternatively a 3D pose denoted by the (x, y, z) coordinates. Key body joints in this sense can include, for example, nose, neck, shoulders, elbows, wrists, ankles, knees, eyes, ear, toes, heels, elbows, etc.

Figure 3:
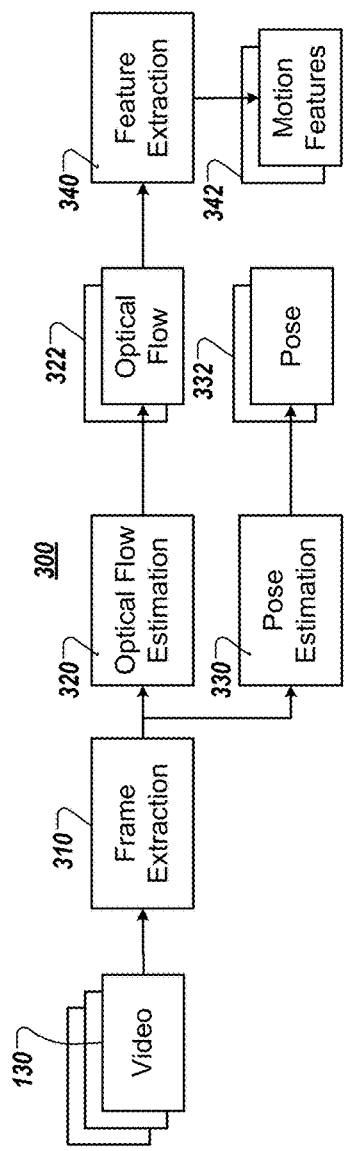
FIG. 3 is a flowchart of an embodiment of a method for estimating motion features and human poses from videos, according to the disclosure.

FIG. 3 is a flowchart of an embodiment of a method for estimating motion features and human poses from videos, according to the disclosure. A method 300 can be performed by the system 200, for example. The method 300 can leverage the advances of deep learning representations to extract features from multiple modalities including RGB image $f_{rgb}$, optical flow $f_{motion}$, and human pose $f_{pose}$. The RGB modality represents visual appearance.

The latter two modalities, optical flow $f_{motion}$ and human pose $f_{pose}$, respectively represent short-term and long-term motion information related to the sequence of video frames from the video stream 130, for example. To capture short-temporal relationships, the method 300 can implement a stack of L video frames (e.g., from the video stream 130) as input, as opposed to a single image. The feature representations $f_{rgb}$, $f_{motion}$, and $f_{pose}$ are described in the following.

RGB feature extraction. The frame level features are extracted from a ResNet-18 convolutional neural network (CNN). The standard ResNet-18 CNN takes in RGB images and has an input channel of 3. To accommodate a stack of L frames as input, the input channel of the ResNet-18 CNN network is adjusted from to L×3. The final RGB representation $f_{rgb}$ is a 512-d vector extracted from the last average pooling layer. In addition to ResNet-18, alternative off-the-shelf CNN networks such as VGG, Densenet, or with different layers such as ResNet-34, can be employed in other example implementations.

Optical flow feature extraction. A deep learning based optical flow estimator (e.g., FlowNet 2.0) can be employed to compute the optical flows between two consecutive frames of the video stream 130. For each time step t, such a system can generate two-channel flow frames where each channel contains displacements at x and y axis respectively. Similar to the RGB modality, we use L stacked optical flow frames as input to a ResNet-18 CNN and change the number of input channels to L×2. The final representation $f_{motion}$ is a 512-d vector.

Pose extraction. Pose has recently gained significant interests due to the success of real time body points detection from a single image. For the pose modality, an off-the-shelf pose estimator (e.g., OpenPose) can be employed to determine the joint locations of key body points from each frame. Since each joint location can be represented by a pair of 2D coordinates, each pose is encoded by a 1D vector with num_joints×2 elements. The final pose representation $f_{pose}$ is a concatenation of poses from L frames, with a total size of 1×L×num_joints×2 elements. Given a video (e.g., the video stream 130), the system can first extract all the frames at a fixed sampling rate (e.g., 30 fps). At each time step t, the RGB, optical flow, and the pose feature are used separately or concatenated together as the final multi-modal feature representation denoted as $f_t$.

At block 310, the system 200 can extract all video frames from the video stream 130, at a fixed sampling rate (e.g., 30 frames per second (fps)), or a frame that would permit the depiction of smooth motion. Fixing the sampling rate across all video frames is important to maintain a consistent comparison for prediction of the future actions and poses on a frame by frame basis. If the sampling or frame rate is inconsistent, the speed of an action can become ambiguous. Thus, with inconsistent frame rate, it would be difficult for the model to learn the dynamic of an action. As used herein, 30 fps is not limiting on the disclosure. Other sampling rates below or above 30 fps are possible, for example, 40, 45, 50, 60 fps or more are possible, including any intervening frame rate values. Common video frame rates include but are not limited to 24, 29.97, 30, 59.94, and 60 fps. For processing, rates may be normalized to 29.97 or 30 fps (24 fps typically appears in cinematic movies). Thus, the example implementations may include a frame rate between 24 fps and 60 fps.

The extracted video frames are then used to compute the features of two different domains i.e., skeleton pose feature and motion feature for subjects within the video.

At block 330, pose estimation can model skeleton pose features 332. During the pose estimation at block 330, joint locations of one or more humans in each video frame can be estimated using an off-the shelf pose estimation deep model. Each joint location of the pose features 332 can be represented by a two dimensional (2D) coordinates or a 3D coordinates. Thus, each pose can be described as 1×$num_{joints}$*2 vector.

At block 320 the optical flow estimation can be used to model motion features. In block 320, or motion branch of the method 300, an optical flow estimation deep model can be implemented to compute the optical flow 322 between each pair of consecutive video frames (e.g., of the video stream 130). Note that the width and height of optical flow is the same as those of an RGB frame associated with the video stream 130, however, the optical flow 322 has two channels standing for the displacement values for each of the x axis and y axis.

At block 340, a pre-trained feature extractor can produce motion features 342 for each video frame. The feature extraction of block 340 can receive stacked optical flow as input, which concatenates the optical flows of current time and previous num_stack timesteps. The output of block 340 can include short-term motion features 342 with a dimension of motion–dim. Using early fusion for each frame, the motion feature and the pose feature are concatenated together as the final feature for the following process.

The method 300 can also implement late fusion to efficiently represent combined features of both modalities (e.g., pose and optical flow/motion). Unlike early fusion, which employs only one encoder (e.g., the encoder 210 having a single RNN) to capture temporal patterns from concatenated features, late fusion can include different encoders for individual modalities before the concatenation, resulting in separate hidden states for motion and pose. In some examples, the encoder (e.g., the encoder 210) can be an RNN such as a GRU cell, similar to those described above in connection with FIG. 2.

Compared with early fusion, late fusion increases model complexity due to introducing additional encoder structures. However, since motion features are dense descriptors for local variances, while poses can be regarded as higher level abstractions for sequential dynamics, divided latent spaces of late fusion allows more flexibility than early fusion for modeling such different types of temporal dependencies.

Therefore, in order to further improve the decoding process of the method 300, the (first or primary) GRU 222 and 212 can be augmented with a secondary GRU cell during the training stage to form a bidirectional structure. In addition to future pose prediction via the first GRU 222, the second GRU cell 222 is initialized with the same hidden states, but aims to reconstruct previous inputs in a reversed order. The bidirectional GRU better captures the context as it runs inputs from past to future and from future to past, which will preserve information from both past and future. More specifically, at each time step, the rebuilt pose of current frame is provided for reconstructing the input pose from last frame. This forces the hidden states (e.g., the state 230) to maintain enough necessary historical information regarding the pose and motion which can be critical for recovering every past frame. Thus after training, the hidden states may be more capable of capturing long-term patterns even though such augmented structure is reduced to initial single GRU decoder and the secondary GRU is removed during the testing stage.

Figure 4:
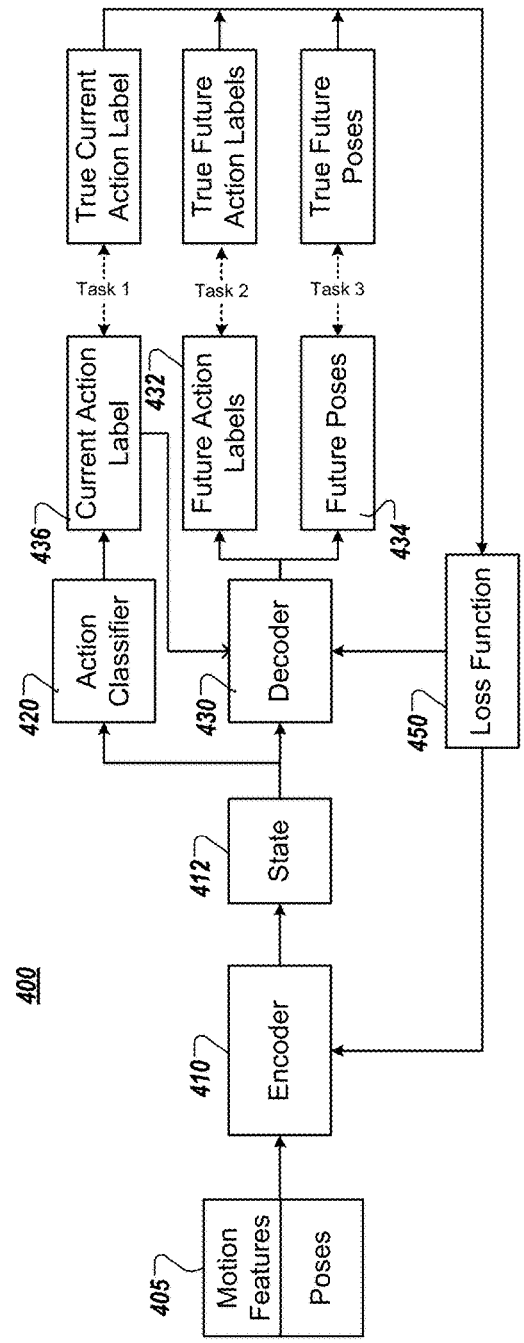
FIG. 4 is a flowchart of an embodiment of a method for multi-task training of a sequence-to-sequence model, according to the disclosure.

FIG. 4 is a flowchart 400 of an embodiment of a method for multi-task training of a sequence-to-sequence model, according to the disclosure. A sequence-to-sequence model can address the forecasting problem explained above. The disclosed method can include encoder 410 configured to encode past information and the decoder 430 configured to predict future actions and poses (e.g., of individuals in the video stream 130). The encoder 410 can implement a RNN (e.g., a GRU) to encode the multi-modal features from past video sequences (e.g., from the video stream 130) and determine a current action type.

The decoder 430 is set as the same value as that of the current hidden state 412 of the encoder 410. By feeding the predicted current action and detected pose as a starting point, the decoder 410 can (e.g., using a GRU) progressively generate future sequence-of-action and pose pairs. Both the encoder 410 and the decoder 430 can be RNN-based models. At every timestep, the encoder 410 can receive as input the final features of current frame as well as all the previous frames. As an RNN can model the dependencies among different elements in a sequence, the encoder 410 encodes all of the observed frames into a hidden state, which is the long-term information of the sequence.

Given the encoded hidden state 412 from the encoder 410, the decoder 430 can progressively output both action labels 432 and poses 434. Since the input of the decoder 430 and output of the encoder 410 should be the same, inputs to the decoder 430 can also be action labels 432 and poses 434. However, there is no action label at any timestep.

In some implementations the encoder 410 can also recognize the action category of current frame. An action label as well as the computed pose at current timestep can then be fed into the decoder 430 as its input of the first timestep. Then the decoder 430 outputs the prediction results, i.e., action label and pose, of the first timestep. For the following timesteps, the decoder 430 takes the outputs of previous timestep as input until it meets the maximum timesteps. As a result, the system 400 can provide the predicted future action label and pose of every timestep.

The method 400 can include three tasks, labeled Task 1, Task 2, Task 3, in FIG. 4. These tasks include recognizing current action label (Task 1), predicting the future action labels (Task 2), and predicting future poses (Task 3). Although they are separate tasks, they are not completely independent of one another. For instance, knowing the current action label 436 will help to predict future action labels as they are evolved from current ones. On the one hand, the future action labels will act as additional verification for predicting future poses. In this way, the pose prediction module may only model poses belonging to specific actions, which will alleviate the burden of this module thus make it easier to learn. On the other hand, apart from the action label of current timestep, the future poses can serve as additional information for future pose prediction. In summary, the three tasks are closely related to each other and thus are natural candidates for joint learning.

As is shown in FIG. 4, the proposed model consists of one backbone network with shared weights and three heads to accomplish these tasks. With the help of multi-task learning, the proposed model is trained jointly. The multi-task encoder-decoder recurrent network is jointly optimized end-to-end with a loss function 450. The loss function can be expressed as in equation (1) below:

$$\mathcal{L}_{total} = \qquad (1)$$
$$\mathcal{L}_{cls} + \lambda \mathcal{L}_{reg} = -\frac{1}{T}\sum_{t=0}^{T-1}[L_{cross-entropy}(y_t, \hat{y}_t) + \lambda \cdot \text{smooth}_{L1}(p_t, \hat{p}_t)]$$

Here $\mathcal{L}_{cls}$ is the sum of the action classification loss for each frame from time t to t+T. $\mathcal{L}_{reg}$ is the sum of the £1 smooth regression loss of pose joint locations for each frame from time t to t+T. λ is a scalar parameter that balances the two types of losses. It is noted that action classification is performed by action classifier at 420 to define the current action label 436. The system 400 is naturally able to handle different prediction lengths based on the incorporation of the RNN model within the decoder 430. As used herein, a prediction length is the amount of time into the future the system 400 can provide a motion and pose prediction.

Given the encoded hidden state 412 from the encoder 410, the decoder 430 is able to progressively output both action labels and poses by itself. At the first predicting timestep, the decoder 430 also takes the recognized action label and pose at last seen timestep as inputs. For the following timesteps, the decoder 430 always takes the outputs of previous timestep as the inputs of current timestep, i.e., hidden state, action label and pose. Therefore, the length of predictions are set as a variable parameter of the system. It can predict as long as it is set during inference.

Figure 5:
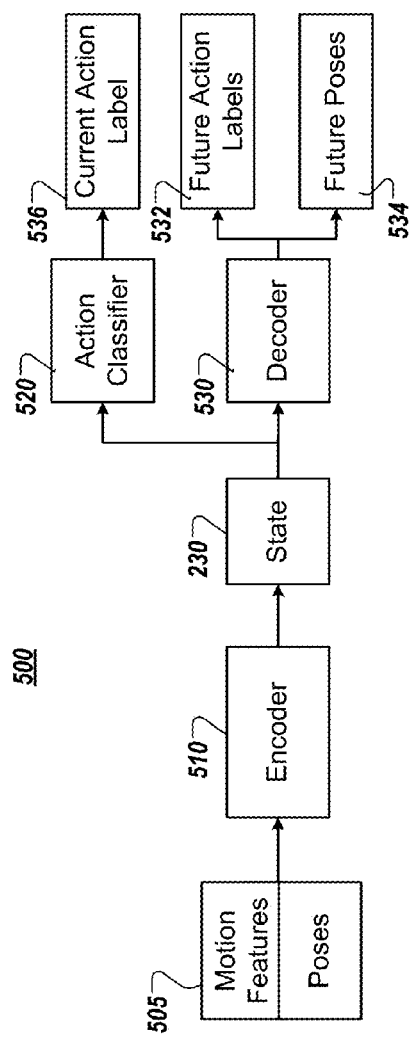
FIG. 5 is a flowchart of an embodiment of a method for providing inferences using the trained model, according to the disclosure.

FIG. 5 is a flowchart of an embodiment of a method for providing inferences using the trained model, according to the disclosure. At block 505 (similar to block 405), motion features 110 and poses 120 are extracted from the video stream 130. At block 510, the extracted motion features 110 and poses 120 can be encoded (e.g., by the encoder 210 or 510) as state information 230.

Based on the trained model produced by the method 400, the action classifier 520 can perform action classification at block 520 to define the current action label 536.

At block 530, the decoder 220 can decode the state 230 to predict future labels 532 and future poses 534 based on the model from the method 400. The current action label 436, the future action labels 432, and the future poses 434 are distinct from the current action label 536, the future action labels 532, and the future poses 534, for the situation where the method 500 is used for motion and pose prediction, as opposed to for the purpose of training the model.

Figure 6:
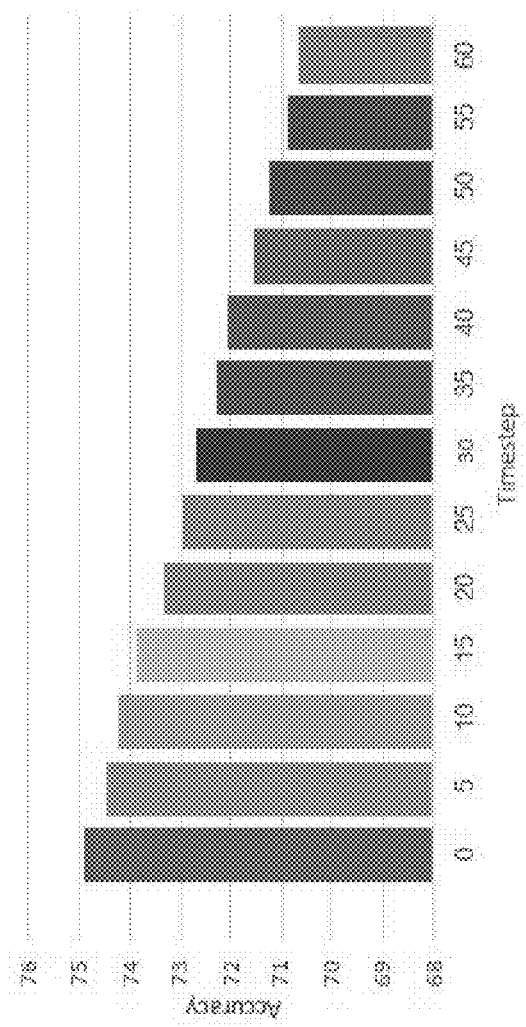
FIG. 6 is a graphical depiction of action prediction accuracies of different prediction length using test data.

FIG. 6 is a graphical depiction of action prediction accuracies of different prediction length using test data. The table methods 400 and 500 can be evaluated based on test data. For example, simple procedures such as furniture assembly can be used as a proxy for another, possibly more complex, task. An example dataset has a set of videos (e.g., the video stream 130) of individuals assembling a small piece of furniture.

The exemplary dataset had 101 short videos, each about 2-4 minutes long, and shot at 30 frames per second. The example scenario includes 14 actors in the videos, with sequences from 11 actors being implemented for training and validation using the method 400, while testing is completed using the method 500 on the balance. Half of the sequences show assembly on the floor, while the other half show assembly on a workbench. Exemplary action labels for the videos includes, for example, four "attach leg" actions (one for each leg), four "detach leg" actions, a "pick leg" action, a "flip table" action, "spin in" and "spin out" actions, and a null action for frames that are not or could not be labelled by the method 400.

The system 200 can be evaluated based on two aspects, action prediction accuracy and the performance of future pose prediction. In the first aspect, the action prediction accuracies can be compared to state-of-the-art or off-the-shelf models and action prediction accuracies of different prediction lengths. The two selected control methods are 1) LSTM using a two-steam prediction system and 2) LSTM using improved dense trajectories (iDT).

As is shown in Table 1 below, the accuracy of next first prediction ($Acc_0$) of the method 500 (e.g., sequence-to-sequence or seq2seq) is higher than by more than 11.1% than both of the controls. Moreover, the two other prediction methods can only predict next one timestep while the model implemented by the method 400 and the method 500 can predict multi-consecutive timesteps, or a sequence.

In the disclosed test, the method 500 was able to achieve 74.3% accuracy on the next fifth prediction (Acc4), or four addition steps past $Acc_0$, which is only slightly lower than that of the 1st prediction. The reduction in prediction accuracy is due to reduced amounts of information for future poses/motions and thus the lower the prediction accuracy. As shown in FIG. 4, the relationship between action prediction accuracy and prediction length is shown every 5 timesteps from next 1st ($Acc_0$) to 61th. As shown, the accuracy decreases as the length of prediction increases, which demonstrates the above point.

TABLE 1

| Forecasting Methods | $Acc_0$ | $Acc_4$ |
|---|---|---|
| LSTM + Two-stream | 55.6% | — |
| LSTM + iDT | 65.2% | — |
| Seq2seq | 76.3% | 74.3% |

Figure 7A:
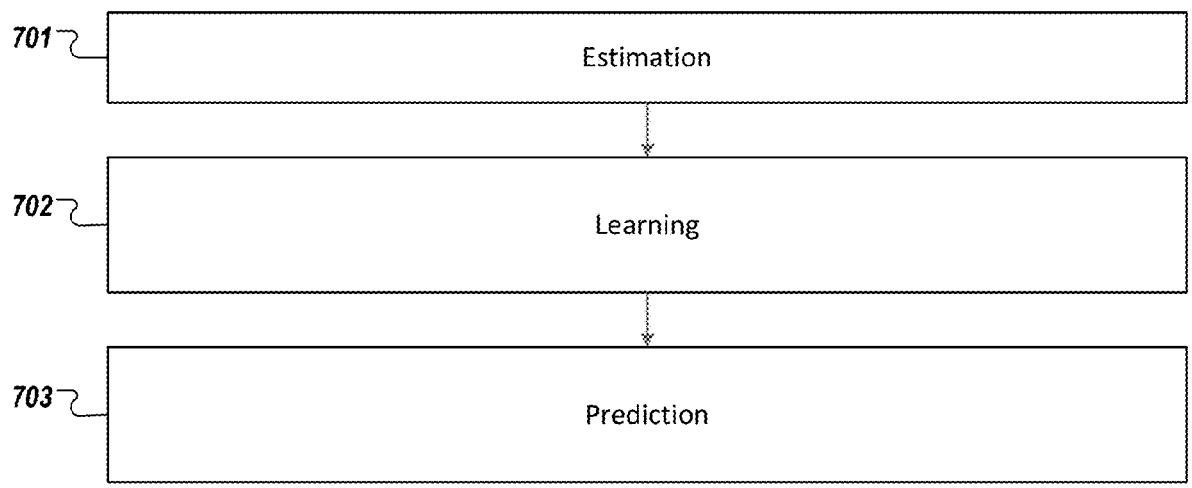
FIGS. 7A and 7B are flowcharts of an embodiment of a method for vision-based joint action and pose motion forecasting according to the disclosure.
Figure 7B:
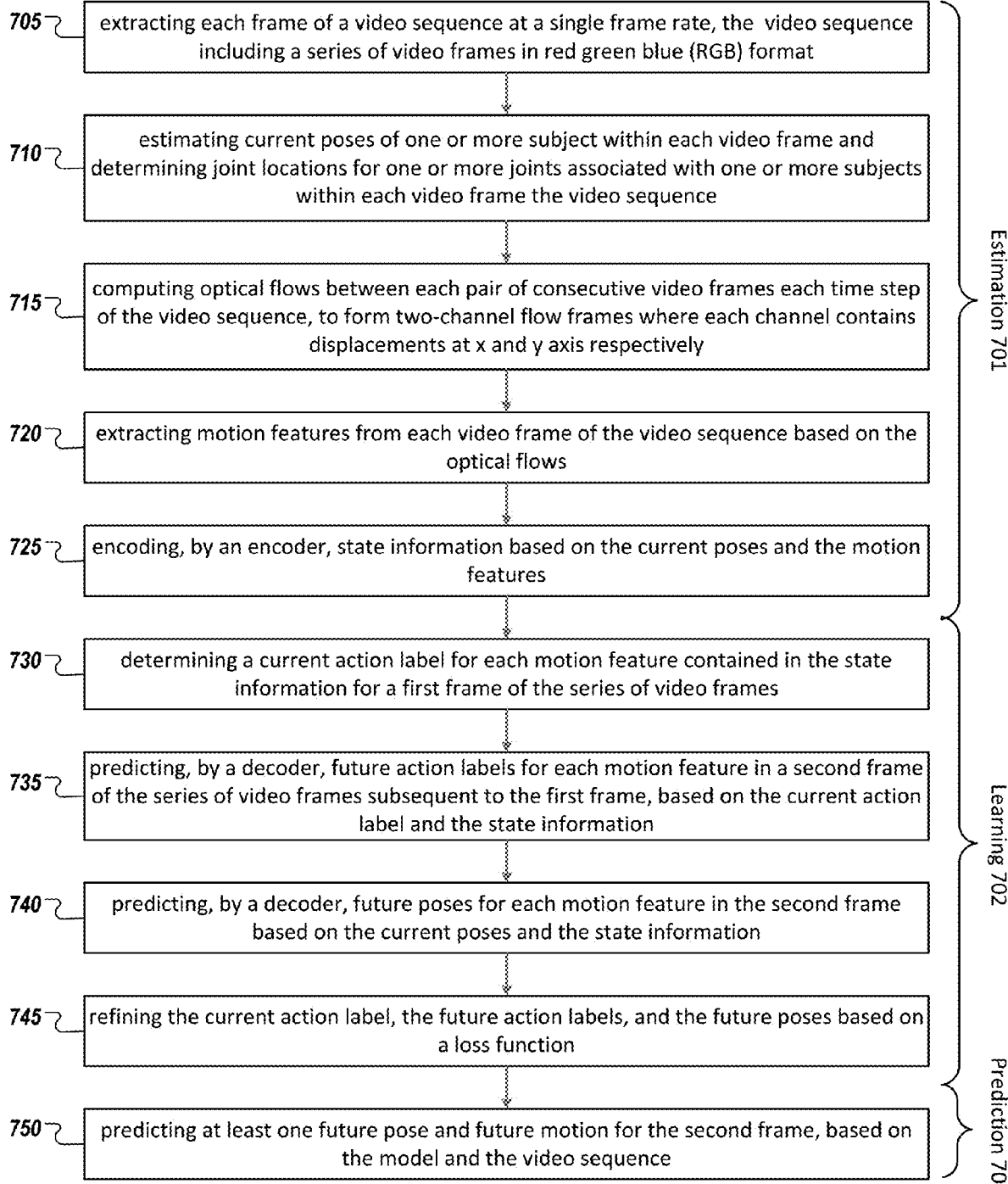

FIGS. 7A and 7B are a flowcharts of an embodiment of a method for vision-based joint action and pose motion forecasting according to the disclosure. A method 700 can be implemented by one or more processors in a computing environment (e.g., the computing environment 1000, described below). In some embodiments, and as shown in FIG. 7A, the method 700 can be a combination of multiple subprocesses, including estimation of current pose and joint motion at 701, training the deep learning model (e.g., learning) at 702, and prediction future motion and poses based on the model at 703.

In more detail, FIG. 7B illustrates further details of the estimation 701, learning 702 and prediction 703, according to the method 700 of the example implementation. Elements 705-725 represent additional details associated with the estimation 701, elements 730-745 represent additional details associated with the learning 702, and element 750 represents additional details associated with the prediction 703.

At block 705, the system 200 can extract each frame of a video sequence (e.g., the video sequence 130) at a single frame rate. The single frame rate can be constant across all video frames of the video sequence. The video frames can be formatted as a red-green-blue (RGB) video format, for example. However, the present example implementations are not limited thereto. For example, but not by way of limitation, while the video frames may be extracted as RGB, the video frames may be represented as YUV in one or more other well know video formats.

At block 710 the system 200 can estimate current poses of one or more subject within each video frame. The system 200 can further determining joint locations for one or more joints associated with one or more subjects within each video frame the video sequence. The determination of joint locations and estimation of poses can happen concurrently, in parallel, or serially, in any order.

At block 715, the system 200 can compute optical flows between each pair of consecutive video frames each time step of the video sequence, to form two-channel flow frames where each channel contains displacements at x and y axis respectively At block 720, the system 200 can extract motion features from each video frame of the video sequence based on the optical flows.

At block 725, the system 200 can encode state information based on the current poses and the motion features.

At block 730, the system 200 can determine a current action label for each motion feature contained in the state information for a first frame of the series of video frames;

At block 735, the system 200 can predict future action labels for each motion feature in a second frame of the series of video frames subsequent to the first frame, based on the current action label and the state information.

At block 740, the system 200 can predict future poses for each motion feature in the second frame based on the current poses and the state information.

At block 745, the system 200 can refine the current action label, the future action labels, and the future poses based on a loss function.

At block 750, the system 200 can predict at least one future pose and future motion for the second frame, based on the model and the video sequence.

For example, embodiments of the method 700 and as otherwise disclosed herein can be applicable for robots or robotic systems. In some examples, a robotic system can implement the method 700 various medical or surgical procedures, improving the speed of various procedures by anticipating a human actor's need, or enhancing speed of training. In at least one example, a robotic assistant in a medical application can anticipate when a patient is about to fall based on immediately past captured video of a patient/human subject, or provide a surgical tool to a surgeon during an operation based on the action of the surgical team.

According to another example use, the activity performed by a surgeon during a surgical operation may be the subject of pose and motion forecasting. Thus, when a surgeon starts to engage in poses and motions that correspond to potential risk, such as placing an incision or a tool in an incorrect location, angle, setting, etc., the example implementations may provide a forecasting output that provides the surgeon with an opportunity to take corrective action and avoid harm to a patient.

In another example use, the method 700 can be implemented in a retail environment for loss- or theft prevention, anticipating the actions of a subject captured on video (e.g., the video stream 130). For example, but not by way of limitation, action forecasting may be used to perform pose motion forecasting on individuals that enter a retail environment, such that poses and motions associated with shoplifting behavior can be detected prior to a theft. Similarly, poses and motions associated with activity in a store that may injure a user or damage to merchandise, such as certain poses of an individual interacting with a product (e.g., individual testing or holding a product that is too large, climbing on a shelf to reach a product on a higher level of a shelf, etc.). Thus, the example implementations may be used to reduce a risk of harm to an individual in a retail environment, such as a customer or employee, as well as identifying and providing an opportunity to intervene in a manner that reduces such risks and loss or theft behavior.

Additionally, the example implementations may be employed in a consumer facing setting, such as a home. Consumer appliances, robotics, communications devices or the like may implement actions based on pose and motion forecasting. For example but not by way of limitation, based on a series of poses and motions, and activity associated with cooking may be forecasts, and appliances in a kitchen may be set to one or more modes, such as preheating thawing, etc., to provide the consumer with additional convenience. In other example implementations, the consumer may be provided with an assistant which can identify when the consumer is performing tasks in an incorrect order (e.g., consumer is cooking and forgets to add an ingredient, or the like), and provide corrective action, to avoid injury, error or other harm. A home assistant product may sense, by audio, video or other sensory or IoT device, such activity, and provide corrective feedback or suggestions to the user in a variety of consumer and home use settings.

The example implementations may also be used in industrial settings, such as manufacturing, assembly, etc. for example but not by way of limitation, poses and motions associated with defects in manufacturing, such as total quality management approaches to quality control, may be used to forecast a defect before it happens. In such an example implementation, a pose or motion associated with a corresponding defect, such as not sufficiently attaching a part, skipping a step in assembly, or using an incorrect tool or incorrect number of parts, may be detected by the pose or the motion of the individual or robot. In response, corrective action may be suggested, additional training may be provided, or other recommendations or actions may be provided, based on the output forecast associated with the pose and motion.

Figure 8:
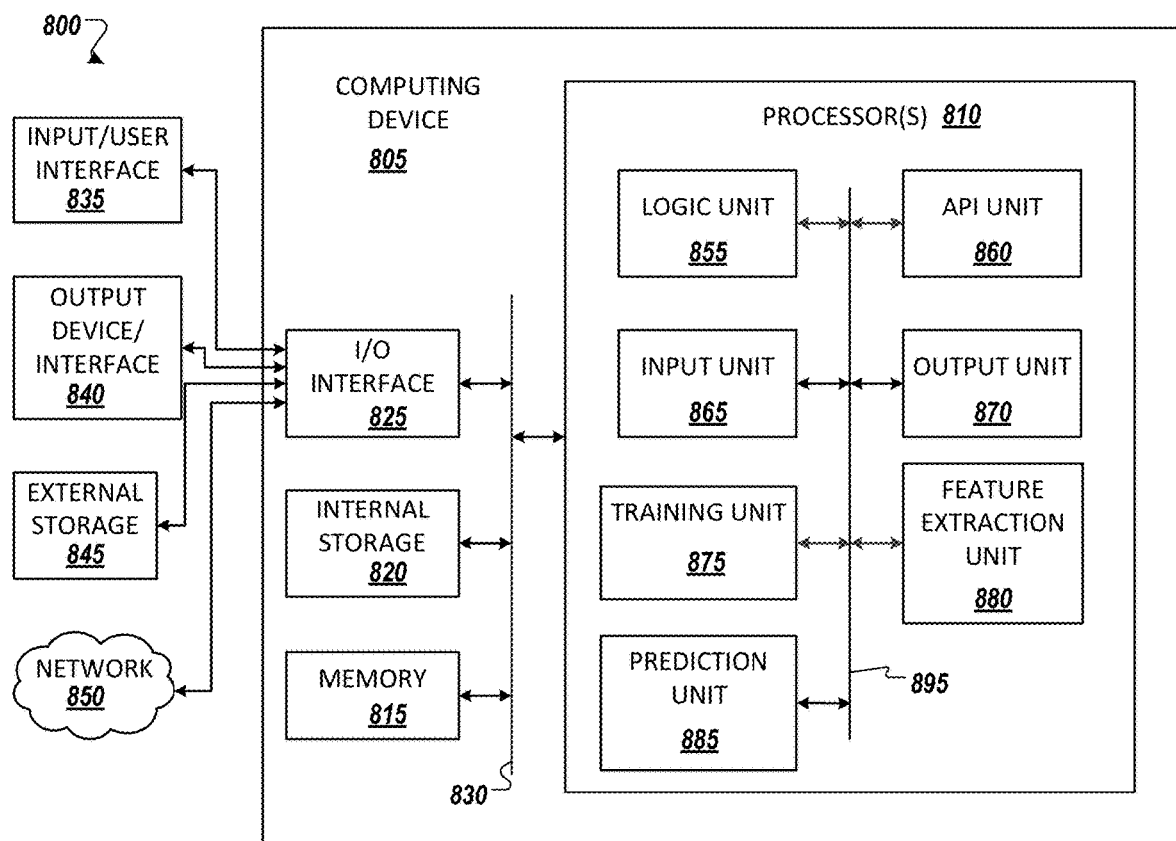
FIG. 8 is a functional block diagram of an embodiment of a computing environment according to the disclosure.

FIG. 8 is a functional block diagram of an embodiment of a computing environment according to the disclosure. A computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805. The environment 800 can support operations associated with the system 200, and the method 80, the method 300, and the method 400.

According to the present example implementations, the processing associated with the neural activity may occur on a processor 810 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations. In various implementations or embodiments of the disclosed systems and methods, an RNN can be implemented using one or more GRU and or LSTM to perform the functions and accomplish the ends described herein.

Computing device 805 can be communicatively coupled to input/interface 835 and output device/interface 840. Either one or both of input/interface 835 and output device/interface 840 can be a wired or wireless interface and can be detachable. Input/interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 840 may include a display, television, monitor, printer, speaker, braille, or the like. In some example implementations, input/interface 835 (e.g., user interface) and output device/interface 840 can be embedded with, or physically coupled to, the computing device 805. In other example implementations, other computing devices may function as, or provide the functions of, an input/interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as, a server, client, thin server, general machine, special-purpose machine, or another label. For example but not by way of limitation, network 850 may include the blockchain network, and/or the cloud.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, training unit 875, feature extraction unit 880, prediction unit 885, and inter-unit communication mechanism 895 for the different units (e.g., the encode 110 and the decoder 120) to communicate with each other, with the OS, and with other applications (not shown).

The training unit 875 can perform functions associated with the encoder 110 and training the model as in the method 300 and the method 400. The feature extraction unit 880 can perform functions associated with the method 300, for example. In some implementations, the feature extraction unit 880 can perform one or more of the frame extraction of block 310, the pose estimation of block 330 (FIG. 3), in addition to the feature extraction of block 340 (FIG. 3). The prediction unit 885 can perform functions associated with the decoder 120, including predictions or anticipation of poses and motion based on the state information 230 in the method 100, the method 300, and the method 400.

For example, the training unit 875, the feature extraction unit 880, and the prediction unit 885 may implement one or more processes shown above with respect to the structures described above in addition to the method 300 and the method 400. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, training unit 875, feature extraction unit 880, and prediction unit 885).

For example, the training unit 875 may receive and process information, from simulated data, historical data, or one or more sensors, as explained above in connection with at least the method 400. An output of the training unit 875 is provided to the feature extraction unit 880, which performs the necessary operations based on the application of the neural networks as described above and illustrated in FIG. 1 through FIG. 5, for example. Additionally, the prediction unit 885 may perform operations and minimize reprojection error to provide an output signal, based on the outputs of the training unit 875 and the feature extraction unit 880.

In some instances, the logic unit 855 may be configured to control the information flow among the units and direct the services provided by API unit 860, input unit 865, training unit 875, feature extraction unit 880, and prediction unit 885 in some example implementations described above. For example, the flow of one or more processes or implementations may be controlled by logic unit 855 alone or in conjunction with API unit 860.

Figure 9:
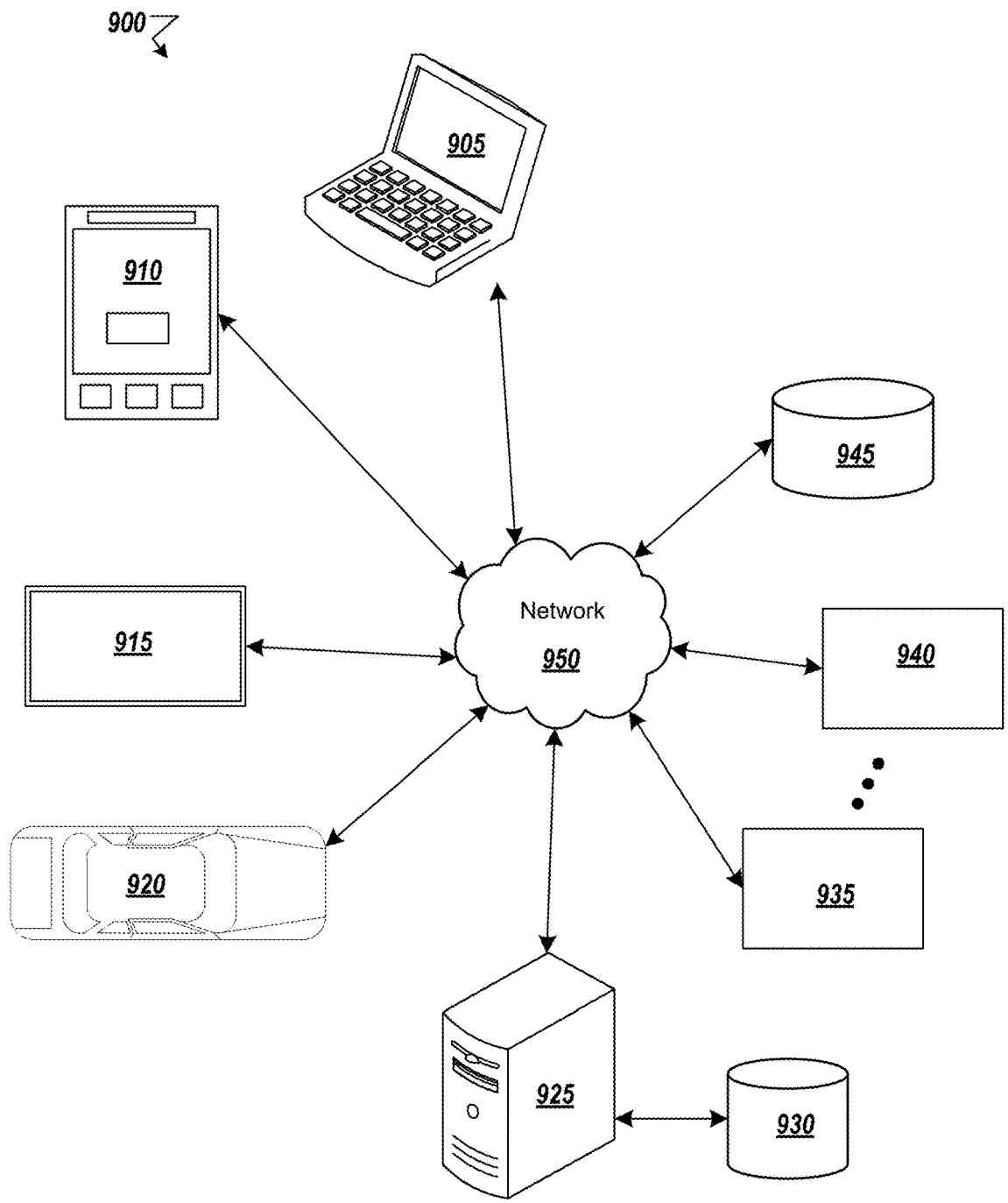
FIG. 9 is a functional block diagram of an exemplary operating environment according to the disclosure.

FIG. 9 is a functional block diagram of an exemplary operating environment according to the disclosure. An environment 900 can be suitable for some example implementations disclosed herein. Environment 900 includes devices 905-945, and each is communicatively connected to at least one other device via, for example, network 960 (e.g., by wired and/or wireless connections). Some devices may be communicatively connected to one or more storage devices 930 and 945.

An example of one or more devices 905-945 may be computing devices 805 described in FIG. 8, respectively. Devices 905-945 may include, but are not limited to, a computer 905 (e.g., a laptop computing device) having a monitor and an associated webcam as explained above, a mobile device 910 (e.g., smartphone or tablet), a television 915, a device associated with a vehicle 920, a server computer 925, computing devices 935-940, storage devices 930 and 945.

In some implementations, devices 905-920 may be considered user devices associated with the users, who may be remotely obtaining a sensed input used as inputs for the foregoing example implementations. In the present example implementations, one or more of these user devices 905-920 may be associated with one or more sensors such as cameras embedded in a user's body, remote from the patient care facility, temporarily or permanently, that can sense information as needed for the present example implementations, as explained above.

While the foregoing example implementations are provided to be indicative of an inventive scope, they are not intended to be limiting, and other approaches or implementations may be substituted or added without departing from the inventive scope. For example, but not by way of limitation, image techniques other than the ones disclosed herein may be employed.

According to one example implementation, an algorithm such as SuperPoint may be used for training image point detection and determination. Further, the example implementation may employ alternative image classification algorithms, and/or use other neural network structures (e.g., Siamese network). Additional approaches a integrate expert knowledge in zone class action, apply enhancement two images by use of techniques such as the formation, lighting and illumination, and/or use a single image to depth method.

The example implementations may have various advantages and benefits, although this is not required. For example, but not by way of limitation, the example implementations are workable on a small data set. Further, the example implementations provide for a constraining of location inside the target tissue, such as the colon or lungs. Thus, a surgeon may be able to more accurately localize a position of a scope anybody by use of video. Further, the example implementations provide a much higher accuracy than related art approaches.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
   extracting each frame of a video sequence at a single frame rate, the video sequence including a series of video frames;
   estimating current poses of a subject within each video frame and determining joint locations for a joint associated with the subject within each video frame;
   computing optical flows between each pair of consecutive video frames for each time step of the video sequence;
   extracting motion features from each video frame of the video sequence based on the optical flows; and
   encoding state information based on the current poses and the motion features.

2. The method of claim 1 further comprising:
   determining a current action label for each motion feature contained in the state information for a first frame of the series of video frames, the series of video frames being in red green blue (RGB) format;
   predicting, by a decoder, future action labels for each motion feature in a second frame of the series of video frames subsequent to the first frame, based on the current pose, action label and the state information;
   predicting, by a decoder, future poses for each motion feature in the second frame based on the current poses and the state information; and
   refining the current action label, the future action labels, and the future poses based on a loss function.

3. The method of claim 2 further comprising predicting at least one future pose and future motion for the second frame based on the model and the video sequence.

4. The method of claim 1 wherein the encoder and the decoder comprise one or more processors.

5. The method of claim 4, wherein the encoder and the decoder are implemented using a recurrent neural network, implementing one or more gated recurrent network.

6. The method of claim 1 wherein the computing the optical flows forms two-channel flow frames where each channel contains displacements at x and y axis, respectively.

7. The method of claim 1 wherein the frame rate is between 24 fps and 60 fps.

8. The method of claim 1 wherein each joint location of the one or more joint locations comprises a pair of two dimensional coordinates (e.g., X,Y) or 3D coordinates (e.g., X,Y,Z).

9. A non-transitory computer readable medium including instructions executable on a processor, the instructions comprising:
   extracting, by an encoder, each frame of a video sequence at a single frame rate, the video sequence including a series of video frames;
   estimating current poses of one or more subject within each video frame and determining joint locations for a joint associated with the subject within each video frame the video sequence;
   computing optical flows between each pair of consecutive video frames each time step of the video sequence;
   extracting motion features from each video frame of the video sequence based on the optical flows; and
   encoding, by an encoder, state information based on the current poses and the motion features.

10. The non-transitory computer readable medium of claim 9 further comprising:
   determining a current action label for each motion feature contained in the state information for a first frame of the series of video frames;
   predicting, by a decoder, future action labels for each motion feature in a second frame of the series of video frames subsequent to the first frame, based on the current pose, action label and the state information;
   predicting, by a decoder, future poses for each motion feature in the second frame based on the current poses and the state information; and
   refining the current action label, the future action labels, and the future poses based on a loss function.

11. The non-transitory computer readable medium of claim 10 further comprising predicting at least one future pose and future motion for the second frame based on the model and the video sequence.

12. The non-transitory computer readable medium of claim 9 wherein the encoder and the decoder comprise one or more processors, and the encoder and the decoder are implemented using a recurrent neural network, implementing one or more gated recurrent network.

13. The non-transitory computer readable medium of claim 9 wherein the computing the optical flows forms two-channel flow frames where each channel contains displacements at x and y axis, respectively.

14. The non-transitory computer readable medium of claim 9 wherein the frame rate is between 24 fps and 60 fps.

15. The non-transitory computer readable medium of claim 9 wherein each joint location of the one or more joint locations comprises a pair of two dimensional coordinates (e.g., X,Y) or 3D coordinates (e.g., X,Y,Z).

16. A system for vision-based joint action and pose motion forecasting including a processor and a storage, the system comprising:
   an encoder configured to extract each frame of a video sequence at a single frame rate, the video sequence including a series of video frames;
   the processor estimating current poses of one or more subject within each video frame and determining joint locations for one or more joints associated with one or more subjects within each video frame the video sequence;
   the processor computing optical flows between each pair of consecutive video frames each time step of the video sequence;
   the processor extracting motion features from each video frame of the video sequence based on the optical flows; and
   an encoder encoding state information based on the current poses and the motion features.

17. The system of claim 16, where the processor is configured to perform:
   determining a current action label for each motion feature contained in the state information for a first frame of the series of video frames;
   predicting, by a decoder, future action labels for each motion feature in a second frame of the series of video frames subsequent to the first frame, based on the current pose, action label and the state information;
   predicting, by a decoder, future poses for each motion feature in the second frame based on the current poses and the state information;
   refining the current action label, the future action labels, and the future poses based on a loss function; and
   predicting at least one future pose and future motion for the second frame based on the model and the video sequence.

18. The system of claim 16 wherein the encoder and the decoder comprise one or more processors, and wherein the encoder and the decoder are implemented using a recurrent neural network, implementing one or more gated recurrent network.

19. The system of claim 16 wherein the processor computing the optical flows forms two-channel flow frames where each channel contains displacements at x and y axis, respectively.

20. The system of claim 16 wherein each joint location of the one or more joint locations comprises a pair of two dimensional coordinates (e.g., X,Y) or 3D coordinates (e.g., X,Y,Z).

* * * * *